United States Patent
Xi (10) Patent No.: US 11,617,110 B2
(45) Date of Patent: Mar. 28, 2023

(54) COMMUNICATION METHOD FOR IMPLEMENTING SUPPLEMENTARY SERVICE, TERMINAL DEVICE AND STORAGE MEDIUM

(71) Applicant: BEIJING XIAOMI MOBILE SOFTWARE CO., LTD., Beijing (CN)

(72) Inventor: Chunyan Xi, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 44 days.

(21) Appl. No.: 17/204,515

(22) Filed: Mar. 17, 2021

(65) Prior Publication Data

US 2022/0038962 A1 Feb. 3, 2022

(30) Foreign Application Priority Data

Jul. 28, 2020 (CN) .......................... 202010735768.9

(51) Int. Cl.
*H04W 36/00* (2009.01)
*H04W 8/18* (2009.01)

(52) U.S. Cl.
CPC ....... *H04W 36/0022* (2013.01); *H04W 8/183* (2013.01)

(58) Field of Classification Search
CPC . H04W 36/0022; H04W 8/183; H04W 48/18; H04W 4/16; H04W 36/14; H04L 65/1016; H04L 65/1059; H04L 65/1073; H04M 7/1205
USPC .................... 370/331; 455/414.1, 432.1–444
See application file for complete search history.

(56) References Cited

U.S. PATENT DOCUMENTS

2010/0041375 A1* 2/2010 Osborn ................. H04W 12/06 455/411
2015/0282012 A1* 10/2015 Baek ....................... H04W 4/16 370/331

FOREIGN PATENT DOCUMENTS

| CN | 104066045 A | * | 9/2014 |
| CN | 105897693 A | | 8/2016 |
| WO | WO-2017161723 A1 | * | 9/2017 |
| WO | WO 2017161723 A1 | | 9/2017 |

OTHER PUBLICATIONS

European Patent Application No. 21166030.3 extended Search and Opinion dated Oct. 18, 2021, 8 pages.
Chinese Patent Application No. 202010735768, Office Action dated Nov. 14, 2022, 4 pages.
Chinese Patent Application No. 202010735768, English translation of Office Action dated Nov. 14, 2022, 6 pages.

* cited by examiner

*Primary Examiner* — Michael Y Mapa
(74) *Attorney, Agent, or Firm* — Cozen O'Connor (57) ABSTRACT

A method for controlling communication of a terminal device is provided. The method includes: receiving supplementary item setting information, detecting statuses of an internet protocol multimedia subsystem (IMS) and a UT interface in response to the supplementary item setting information, performing setting of a supplementary item via a packet switch (PS) domain when the IMS in a registered status or the UT interface in an accessible status, and performing the setting of the supplementary item via a circuit switch (CS) domain when the setting of the supplementary item cannot be performed via the PS domain.

17 Claims, 7 Drawing Sheets

COMMUNICATION METHOD FOR IMPLEMENTING SUPPLEMENTARY SERVICE, TERMINAL DEVICE AND STORAGE MEDIUM

CROSS-REFERENCE TO RELATED APPLICATIONS

This application is based upon and claims benefit of priority to Chinese Patent Application 202010735768.9, filed on Jul. 28, 2020, the entire contents of which are incorporated herein by reference.

FIELD

The present disclosure relates to the field of smart device technology, and more particularly, to a method for controlling communication of a terminal device, a terminal device and a storage medium.

BACKGROUND

Conventional voice services operate in a circuit switched (CS) network, which is a switching mode that appeared originally in communication methods and also the most common switching mode, mainly used in a telephone communication network. With development of communication technologies, a modern communication network gradually becomes a full internet protocol (IP) network which is well-adapted and cost-economical. Network operators use an IP multimedia subsystem (IMS) network as a common core network to provide multimedia services to users of the IMS via the IP network. However, the long-term evolution (LTE) network, as a network merely with a packet switched (PS) technology, cannot process CS voice.

SUMMARY

In order to overcome the problems in the related art, the present disclosure provides a method for controlling communication of a terminal device, a terminal device, and a storage medium.

According to the first aspect of the embodiments of the present disclosure, there is provided a method for controlling communication of a terminal device. The method includes receiving supplementary item setting information, detecting statuses of an internet protocol multimedia subsystem (IMS) and a UT interface in response to the supplementary item setting information, performing setting of a supplementary item via a packet switch (PS) domain when the IMS in a registered status or the UT interface in an accessible status, and performing the setting of the supplementary item via a circuit switch (CS) domain when the setting of the supplementary item cannot be performed via the PS domain.

According to a second aspect of the embodiments of the present disclosure, a terminal device is provided. The terminal device includes: a receiving module, a detecting module and a performing module. The receiving module is configured to receive supplementary item setting information. The detecting module is configured to detect statuses of an internet protocol multimedia subsystem (IMS) and a UT interface in response to the supplementary item setting information. The performing module is configured to perform setting of a supplementary item via a packet switch (PS) domain when the IMS in a registered status or the UT interface in an accessible status. The performing module is further configured to perform the setting of the supplementary item via a circuit switch (CS) domain when the setting of the supplementary item cannot be performed via the PS domain.

According to a third aspect of the embodiments of the present disclosure, a terminal device is provided and includes: a processor; memory configured to store instructions executable by the processor. The processor is configured to execute the method for controlling communication of a terminal device as described above.

According to a fourth aspect of the embodiments of the present disclosure, a non-transitory computer-readable storage medium is provided. When instructions in the storage medium are executed by a processor of a terminal device, the terminal device is caused to perform the method for controlling communication of a terminal device as described above.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Reference will now be made in detail to exemplary embodiments, which are illustrated in the accompanying drawings. The following description refers to the accompanying drawings in which the same reference numbers in different drawings represent the same or similar elements unless otherwise represented. The implementations set forth in the following description of exemplary embodiments do not represent all implementations consistent with the disclosure. Instead, they are merely examples of devices and methods consistent with aspects of the disclosure as recited in the appended claims.

Conventional voice services operate in a circuit switched (CS) network, which is a switching mode earliest appears in communication methods and also the most common switching mode, mainly applied in a telephone communication network, having a history of more than 100 years.

With development of communication technologies, a modern communication network gradually becomes a full internet protocol (IP) network which is well-adapted and cost-economical. Network operators use an IP multimedia subsystem (IMS) network as a common core network to provide multimedia services to users of the IMS via the IP network.

However, the long term evolution (LTE) network, as a network merely with a packet switched (PS) technology, cannot process CS voice. In order to solve problems related to the voice services in the LTE network, a voice over LTE (VoLTE) service is proposed, which can complete voice transmission on the LTE network completely, independent on the 2G/3G network.

The VoLTE service is a voice service based on the IMS. Supplementary services in the IMS network environment include call forwarding unconditional (CFU), call forwarding busy (CFB), call forwarding on No reply (CFNRy), call hold (HOLD), call waiting (CW), multi-party call (MPTY) and so on. In the LTE network, voice and related signaling are regarded to be the same as other data, and packed into data packages for transmission. The IMS network receives and processes these data packages, distinguishes signaling part and voice data part of these data packages, and manages a control plane (IMS signalling) and a user plane (IMS traffic) of voice.

With the acceleration of globalization, Chinese manufacture technology advances continually, such that terminal products of China are sold worldwide. However, since there is a large difference between networks at different places, a problem that the supplementary services such as call forwarding, call waiting and call barring integrated on the terminal product cannot be set according to users' aspirations arises, thus affecting normal usage of the users.

In development process, the applicant finds that in a process of performing setting of a supplementary item, a modem of a terminal device has a default customization rule to set conducting transmission via the PS domain or the CS domain, for example setting conducting the transmission via which one of the PS domain and the CS domain by controlling a value of non-volatile memory (NV). However, an application layer of the terminal device sets different parameters for the PS domain and the CS domain, and when the underlying modem has different rules from the upper application layer, the setting of the supplementary item is failed. For example, if the application layer determines that communication is conducted via the PS domain while the underlying modem customizes that the communication is conducted via the CS domain, in this case, since the application layer and the underlying has different settings and the application layer sets the PS domain parameter, a problem arises when the underlying modem tries to conduct communication via the CS domain.

At the same time, MMICODE setting of supplementary service is restricted by a current platform, with a determination whether GSMPhone or IMSPhone is selected for a condition of the UT interface and whether RILJ or QIMS is selected based on whether GSMPhone or IMSPhone is selected. Thus, MMICODE setting selects one of the two options, if one is selected, then the other one cannot be selected, i.e., there is no retry mechanism. In other words, if the selected one option cannot realize the setting, it is impossible to select the other option to retry.

For another example, if the supplementary item is call barring which includes sub-items, such as barring all outgoing calls, barring international calls, barring international calls aboard, barring all incoming calls, barring incoming calls in roaming, and so on. For some overseas networks, for example a Russia operator network, a technician finds in research that when the setting of the supplementary item is performed on call barring (which may realize the setting for all sub-items in the call barring item), for example, cancelling the call barring, i.e., cancelling all restrictions of all the sub-items, the setting cannot be performed successfully either via the PS domain separately or via the CS domain separately. However, the setting can be performed successfully when merely cancelling any one sub-item of the call barring item, i.e., there is a problem to perform the setting of the supplementary item on the call barring item in the Russia operator network.

After the above problem is recognized, in order to fine the reason, the terminal device needs to be test. The technician designs codes again according the test results fed back in the test process, to try to conduct the communication via the PS domain or the CS domain under the above-mentioned case and try to control the application layer to adjust settings to conform to the modem based on suggestions of the underlying modem, so as to form a closed-loop result that meets the control on the supplementary item in the Russia operator network. However, although the above processing way can solve the problem to some extents, it is targeted and is poor-adapted, and the problem cannot be solved fundamentally, such that a large amount of human and no-human resources are wasted for solving the same or similar problem.

The present disclosure provides a method for controlling communication of a terminal device, which may be applied to a mobile terminal, such as a phone, a tablet or the like, and may be also applied in a terminal device and a system using a supplementary server with the Android system. In the present disclosure, the setting of the supplementary item is firstly performed via the PS domain, and when the setting of the supplementary item cannot completed via the PS domain, an attempt is made automatically to complete the setting of the supplementary item via the CS domain, such that a problem that supplementary service cannot be used due to a large network difference can be effectively solved, and it is unnecessary to make a special customization of a terminal product for the difference in overseas networks, thus greatly shortening a delivery cycle of the terminal product, improving use experience of overseas users and facilitating market occupancy of the terminal product.

Figure 1:
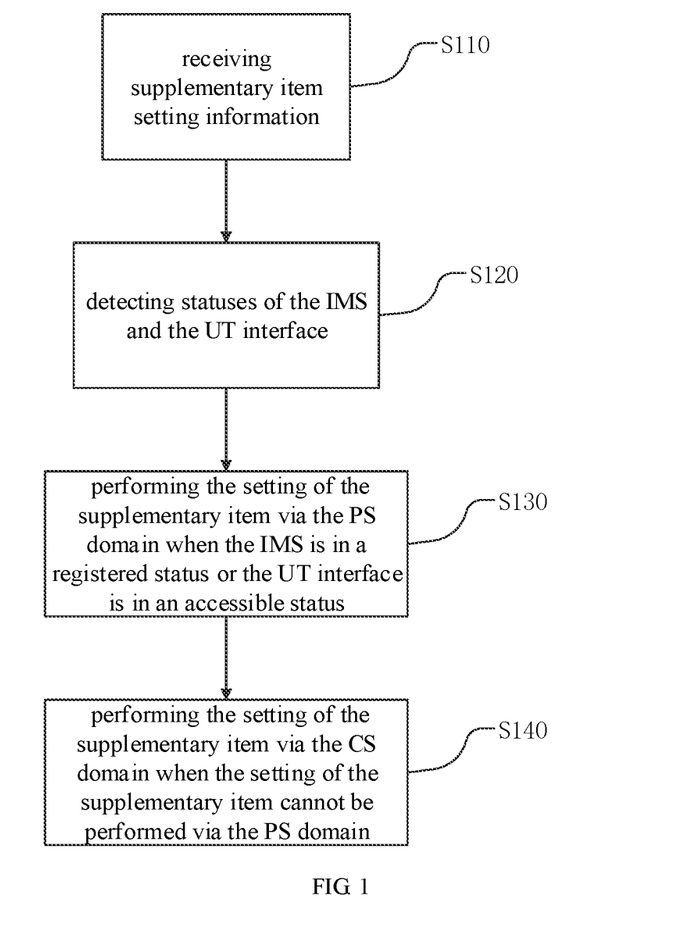
FIG. 1 is a flowchart showing a method for controlling communication of a terminal device according to an embodiment of the present disclosure.

According to an example embodiment, as illustrated FIG. 1, the embodiment provides a method for controlling communication of a terminal device. The method includes the following.

At block S110, supplementary item setting information is received.

In this step, the supplementary item may be a call barring item which may further include sub-items, such as barring all outgoing calls, barring international calls, barring international calls aboard, barring all incoming calls, barring incoming calls in roaming, and so on.

The supplementary item may also be a call forwarding item, a call waiting item or the like. The call forwarding supplementary item may further include sub-items, such as forwarding unconditional, forwarding busy, forwarding on No reply, and so on.

In other embodiments, the supplementary item may also be other supplementary item that is well known to those skilled in the art.

In addition, the supplementary item setting information in this step may be inputted by a user directly, for example, the user operates on a displaying interface of the mobile terminal to enable the supplementary item of call waiting. Or the supplementary item setting information may be automatically generated based on an input of the user, for example, the user operates on a displaying interface of the mobile terminal to disable the supplementary item of call barring, and not all sub-items contained in the call barring item can be disabled due to the overseas operator network, then the setting of the supplementary item is performed on each sub-item, in this case, the supplementary item setting information for each sub-item is not inputted directly by the user, but generated based on the information informing to close the call barring item inputted by the user.

At block S120, statuses of the IMS and the UT interface are detected in response to the supplementary item setting information.

In this step, after receiving the supplementary item setting information from the user, it needs to determine the statuses of the IMS network and the UT interface. Generally, if the IMS service is registered, the UT interface is available. However, in some cases, the UT interface is available even when the IMS service is not completely registered. Thus, in order to prevent the above cases from affecting the setting of the supplementary item, both the IMS network service registration and the UT interface status are detected to improve accuracy of control.

At block S130, the setting of the supplementary item is performed via the PS domain when the IMS is in a registered status or the UT interface is in an accessible status.

In this step, as described above, since the IMS network is used to support calling, more modes of supporting calling can be provided compared to the conventional circuit switched technology. Thus, the setting of the supplementary item is preferentially performed based on the PS domain of the IMS network.

When the IMS is in the registered status, the UT interface is typically in the accessible status, i.e., available, it indicates that the setting of the supplementary item can be performed via the PS domain.

When the IMS is not in the registered status but the UT interface is in the accessible status, the setting of the supplementary item can be performed via the PS domain.

At block S140, the setting of the supplementary item is performed via the CS domain when the setting of the supplementary item cannot be performed via the PS domain.

In this step, in order to ensure that the terminal device may perform the setting of the supplementary item as desired, when the setting of the supplementary item cannot be performed via the PS domain, the setting of the supplementary item is not terminated, but an attempt is made via the CS domain, so as to complete the setting of the supplementary item via the CS domain, such that the function of the supplementary item may become effective regardless of the type of the local operator network even when the mobile terminal is used worldwide, thus improving the usage experience of the user and enhancing product competitiveness.

Figure 2:
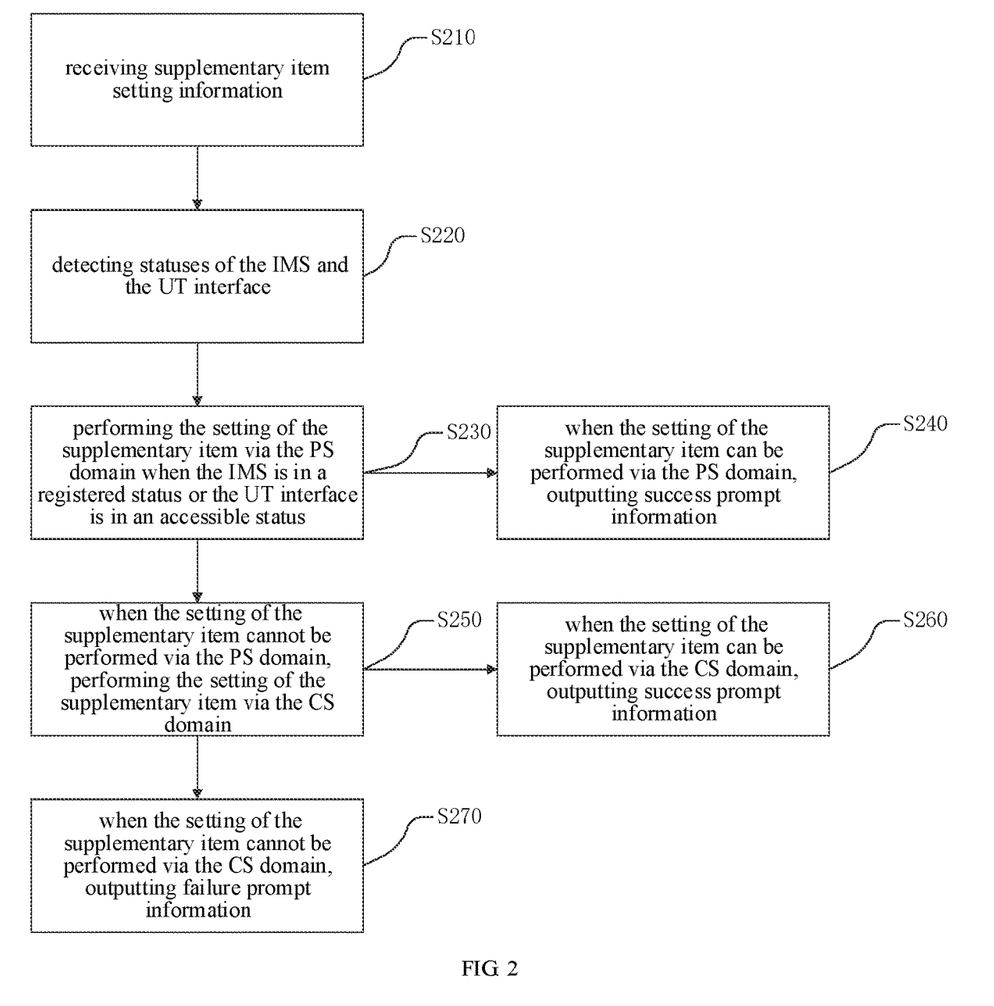
FIG. 2 is a flowchart showing a method for controlling communication of a terminal device according to an embodiment of the present disclosure.

According to an example embodiment, as illustrated FIG. 2, the embodiment provides a method for controlling communication of a terminal device. The method includes the following.

At block S210, supplementary item setting information is received.

At block S220, statuses of the IMS and the UT interface are detected in response to the supplementary item setting information.

At block S230, the setting of the supplementary item is performed via the PS domain when the IMS is in a registered status or the UT interface is in an accessible status.

The contents of the steps at blocks S210-S230 are the same as those of the steps at blocks S110-S130, which are not repeated here.

At block S240, when the setting of the supplementary item can be performed via the PS domain, success prompt information is outputted.

In this step, if the setting of the supplementary item can be performed via the PS domain, it indicates that the supplementary item has been set as desired, for example, enabling or disabling the call barring items is successfully performed, then the success prompt information is displayed on the displaying interface of the mobile terminal to prompt that the setting is successful.

In addition to sending the success prompt information in a form of text, the success prompt information may also be sent via vibration of the mobile phone, or via speech. For example, if the mobile phone vibrates once, it indicates that the setting is successful.

At block S250, when the setting of the supplementary item cannot be performed via the PS domain, the setting of the supplementary item is performed via the CS domain.

In this step, although the setting of the supplementary item cannot be performed via the PS domain, an attempt can be made via the CS domain in this embodiment, and the setting of the supplementary item is not completed. Thus, even when the setting of the supplementary item cannot be performed via the PS domain, there is no failure prompt information.

At block S260, when the setting of the supplementary item can be performed via the CS domain, success prompt information is outputted.

If the attempt made via the PS domain is failed, another attempt can be made via the CS domain. If the setting of the supplementary item can be performed via the CS domain, the requirement of the user on the setting of the supplementary item is met, i.e., the setting is successful, the success prompt information is outputted. The success prompt information may be in a form of text, vibration, speech or the like, such that the user may receive the success prompt information conveniently.

Of course, it should be understood that, either in this step or in step S240, the success prompt information can be omitted. In other words, regardless of whether the setting of the supplementary item is performed via the PS domain or the CS domain, if the setting is successful, the current status is maintained, without outputting the success prompt information.

At block S270, when the setting of the supplementary item cannot be performed via the CS domain, failure prompt information is outputted.

Since the setting of the supplementary item via the CS domain is performed after the setting of the supplementary item via the PS domain, when the setting of the supplementary item cannot be performed via the PS domain, the setting of the supplementary item is performed via the CS domain. Thus, when the setting of the supplementary item cannot be performed via the CS domain, it indicates that the current setting of the supplementary item is failed, and then the failure prompt information is outputted. The failure prompt information may be outputted in a form of text, vibration, speech or the like. For example, the terminal device may vibrate three times to issue the failure prompt information to prompt the user that the setting is failed, such that the user can be reminded of performing the setting process again or using other ways.

Figure 3:
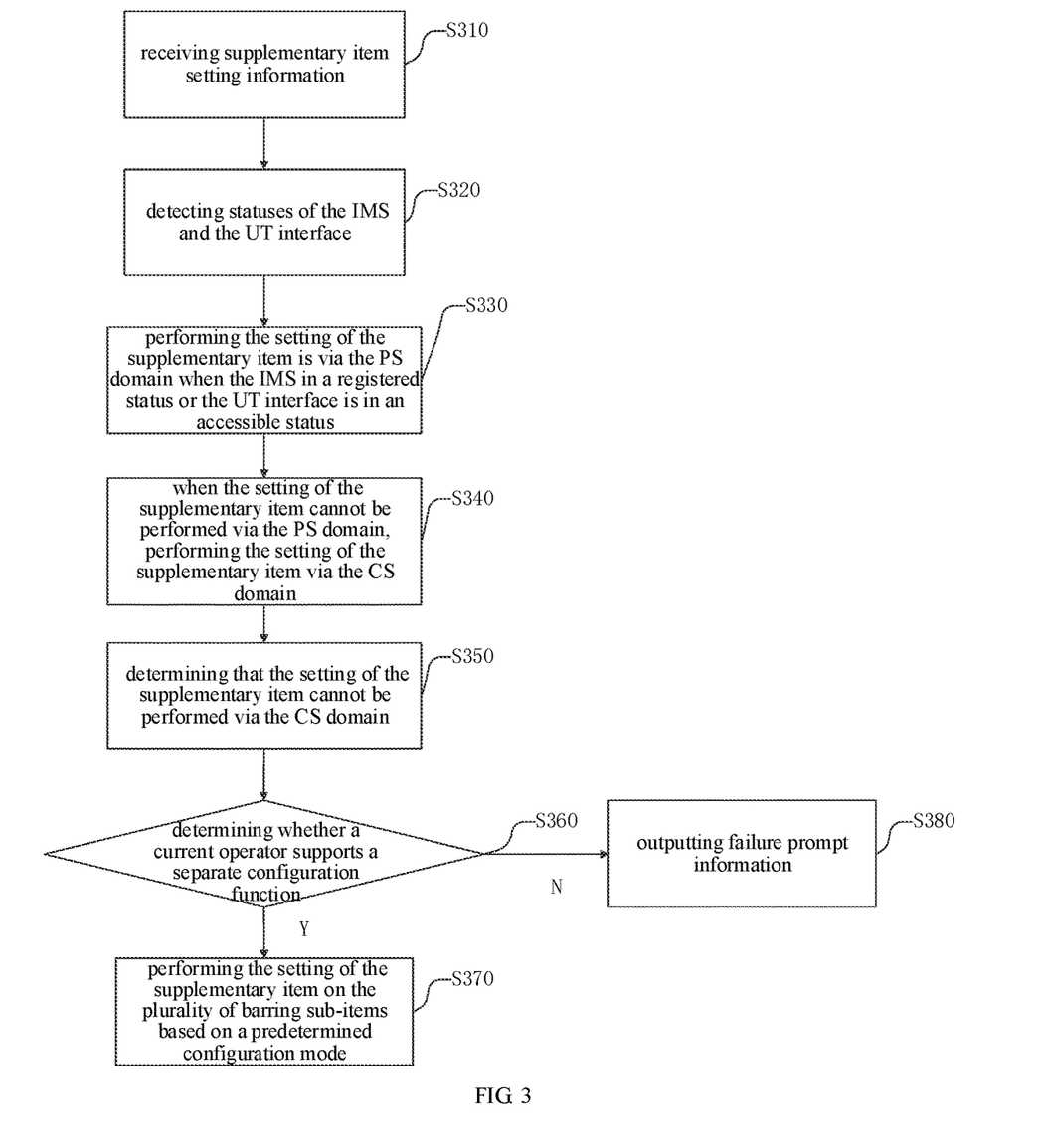
FIG. 3 is a flowchart showing a method for controlling communication of a terminal device according to an embodiment of the present disclosure.

According to an example embodiment, as illustrated FIG. 3, the embodiment provides a method for controlling communication of a terminal device. The method of the embodiment is applied in the setting process when the supplementary item is the call barring item. The call barring item may include sub-items, such as barring all outgoing calls, barring international calls, barring international calls aboard, barring all incoming calls, barring incoming calls in roaming, and so on. The method includes the following.

At block S310, supplementary item setting information is received.

In this step, the supplementary item setting information input by the user through a display screen may be call barring item information, for example, enabling the call barring item or disabling the call barring item. When the call barring item is enabled or disabled, all the sub-items contained in the call barring item are enabled or disabled.

At block S320, statuses of the IMS and the UT interface are detected in response to the supplementary item setting information.

At block S330, the setting of the supplementary item is performed via the PS domain when the IMS is in a registered status or the UT interface is in an accessible status.

In this step, when the supplementary item is the call barring item, which includes the call barring item and all sub-items in the call barring item, the setting of the supplementary item performed via the PS domain may include querying modem RIL by invoking an ImsUtInterface interface via an IMSphone, to perform the setting of the supplementary item.

At block S340, when the setting of the supplementary item cannot be performed via the PS domain, the setting of the supplementary item is performed via the CS domain.

In this step, when the supplementary item is the call barring item, the setting of the supplementary item performed via the CS domain may include querying modem RIL by invoking a RIL java interface via a GsmCdmaPhone, to perform the setting of the supplementary item.

At block S350, it is determined that the setting of the supplementary item cannot be performed via the CS domain.

At block S360, it is determined whether a current operator supports a separate configuration function.

When the current operator supports the separate configuration function, step at block S370 is executed. When the current operator does not support the separate configuration function, step at block S380 is executed.

At block S370, the setting of the supplementary item is performed on the plurality of barring sub-items based on a predetermined configuration mode.

In detail, the block S370 includes the following.

At block S371, barring sub-item setting information of the plurality of barring sub-items is configured as the supplementary item setting information according to a predetermined order.

In this step, the predetermined order may be stored in the mobile terminal in advance. For example, the order may be sequentially barring all outgoing calls, barring international calls, barring international calls aboard, barring all incoming calls, barring incoming calls in roaming, and so on. The predetermined order may be adjusted based on the model of the mobile terminal so as to ensure that the sub-items may be configured as the supplementary item one by one and sequentially.

At block S372, a step of receiving the supplementary item setting information is performed after the barring sub-item setting information of each of the plurality of barring sub-items has been configured as the supplementary item setting information.

In this step, after the barring sub-item setting information of one of the plurality of sub-items is configured as the supplementary item setting information, for example, the item of barring international calls is configured as the barring item, step at block S310 is executed to proceed. At the step at block S310, the barring item becomes barring international calls, and the barring international calls is configured as the barring item in the steps subsequent to step S310.

In other words, when the setting on the call barring item cannot be performed via the PS domain and the CS domain, it needs to configure each sub-item of the call barring item as the barring item to perform the setting of the supplementary item via the PS domain. When the setting of the supplementary item cannot be performed via the PS domain, the setting of the supplementary item is performed via the CS domain.

Each sub-item of the call barring item will be subjected to the above two steps, until the above two steps and the setting of the supplementary item are performed for each sub-item.

At block S380, failure prompt information is outputted.

If the current operator does not support the separate configuration function, it indicates that the setting cannot be performed on the call barring item. The failure prompt information is outputted to remind the user, such that the user may conduct other processing timely when the user needs to perform operations on the call barring item.

The method of the embodiment is applied to for example the Russia operator network, the applicant fins that when the setting is performed on the call barring item in the Russia network, when all functions of the call barring are cancelled, the setting cannot be performed either via the PS domain or the CS domain. However, when separately disabling any one function of barring all outgoing calls, barring international calls, barring international calls aboard, barring all incoming calls, barring incoming calls in roaming, the setting can be performed successfully. For the problem existing in the Russia operator network, with the method of the embodiment, the user only needs to perform one setting operation, and the effectiveness of the setting of the supplementary item can be ensured, such that it is convenient for the user, and the problem that the setting of the supplementary item is failed due to the overseas network differences can be solved, thus improving user experience.

Figure 4:
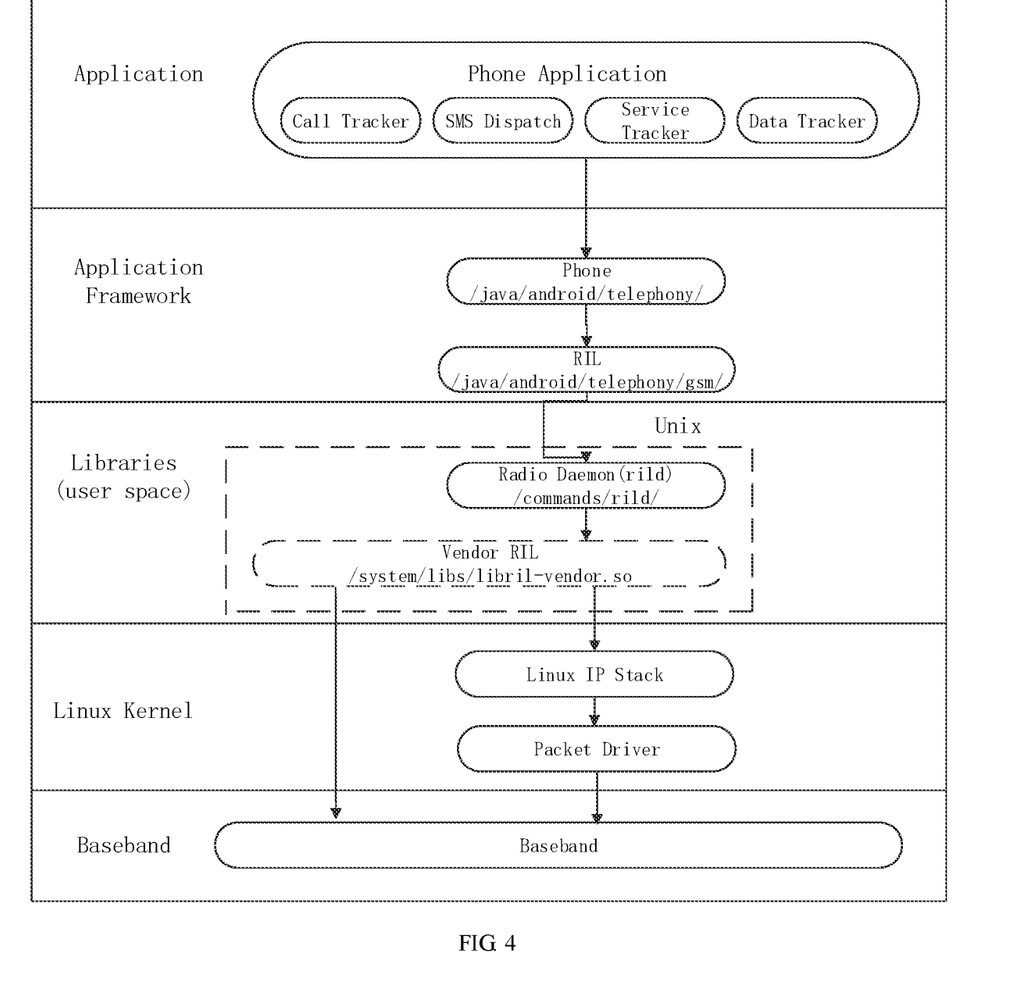
FIG. 4 is a schematic diagram showing architecture of a terminal device according to an embodiment of the present disclosure.

In order to explain an application of the method of the present disclosure, the communication framework of the terminal device implementing the method will be described. As illustrated in FIG. 4, the method of the present disclosure is applied in the Android system communication framework which includes the following.

(1) APP, application layer, (shown as Application in FIG. 4). The application layer mainly serves typical application of various scenes, for example phone application Incallui, message application, address list application or the like. The application layer mainly sends a command of the user to the RIL Framework (i.e., RILJ) in the architecture, involving call tracker in the phone application, SMS dispatch, service tracker, data tracker and so on.

(2) Architecture layer (i.e., Application Framework in FIG. 4). It is the architecture layer of the Android system, mainly obtains modem signal parameters reported from the underlying, communication basis information such as network status. The architecture layer also is responsible for selecting the network links, controlling the scenes and transmitting the data packages. At the same time, the Framework layer is further responsible for storing and querying information in the card, for example storing database in the card. The framework layer mainly includes two parts of contents, one part is a phone interface layer (Phone) and the other part is a wireless interface layer (RIL). RIL is the abbreviate form of radio layer interface. The phone layer interface may support java, android and telephony etc. The RIL layer may support java, android, telephony and gsm etc.

RIL is one interface of the operating system, which is responsible for providing the interface to control the modem and radio of the phone. RIL is an intermediate layer sending a communication request of an application to the communication processor (CP), which includes two parts, one part is the java layer RILJ and the other part is the C++ layer (which can be regarded as HAL layer corresponding to CP) RILD. RIL Java (RILJ) is responsible for sending the communication request of the application layer to the HAL layer. RIL C++ (RILD) is used as a daemon process of the system, which is responsible for sending a request command of RILJ to CP.

RILJ is a part of the phone process of the system, which is located as the phone process launches. The RILD daemon process is loaded via the Init process of Android. The function of the RILD daemon process mainly sends the request sent from RILJ to CP continually, and sends the status change of CP to RILJ at the same time.

(3) Storage space (Libraries in FIG. 4, i.e., user space), is mainly sued to provide storage space for various processes and applications. The storage space uses Unix (timestamp) for management, involving radio occupancy space (Radio Daemon) and a third-part interface layer (Vendor RIL).

(4) Hardware abstraction layer (HAL), is mainly responsible for launching the mobile terminal, setting router parameters and the firewall, and sending the data package to the Linux kernel layer. The hardware abstraction layer is located on the interface layer between the kernel of the operating system and the hardware circuit, its purpose is to abstract the hardware. The hardware abstraction layer hides details of the hardware interface of a specific platform, and provides a virtual hardware platform for the operating system, such that the operating system has hardware independence and can be transplanted on various platforms.

(5) Linux Kernel layer, i.e., driving layer, refers to the Linux kernel. Linux is a kernel of an open-source computer operating system, which is written in C language, is mainly responsible for driving the terminal device and processing the Linux Tcp/IP protocols. It mainly involves the Linux IP stack and the packet driver. During transmission of information of the packet service, the third-party interface layer (Vendor RIL) transmits the information to the Linux IP stack, then transmits to the packet driver, and performs transmission via the radio frequency layer. The driving layer transmits the command to CP after receiving the data, and CP sends the command to the network end. After the result returned from the network end, CP transmits back the result to RILD.

(6) Modem layer, is a part of communication protocol processing. The data package is processed by PDCP/RLC/MAC and sent to the radio frequency layer.

(7) Radio frequency layer, i.e., baseband, is a functional module used to receive, send and process high-frequency radio ware, which includes radio frequency receiving and radio frequency transmitting, and completes the task of sending the data package to the base station. During transmission of voice and control information, the information is directly sent via the third-party interface layer (Vendor RIL) to baseband, i.e., the transmitter, which sends information out. The method of the present disclosure mainly involves the framework layer and the application layer. When the method of the present disclosure is applied, the user may supplement services through the TeleService setting page (telephone service setting page), which is mainly responsible for proving the user an entry for setting the call forwarding, the call waiting, the call barring and so on. The GsmCdmaPhone process created when the phone process service is launched is responsible for processing a request of an upper layer, sending the request to the underlying, and processing information transmitted from RIL. The GsmCdmaPhone process is used to create the GSMPhone process or the CdmaPhone process when the mobile phone is turned on. When the IMS service is registered, the IMSPhone process is created. When the IMS service is not registered, if the IMSPhone process exists, then the IMSPhone process is killed.

Figure 5:
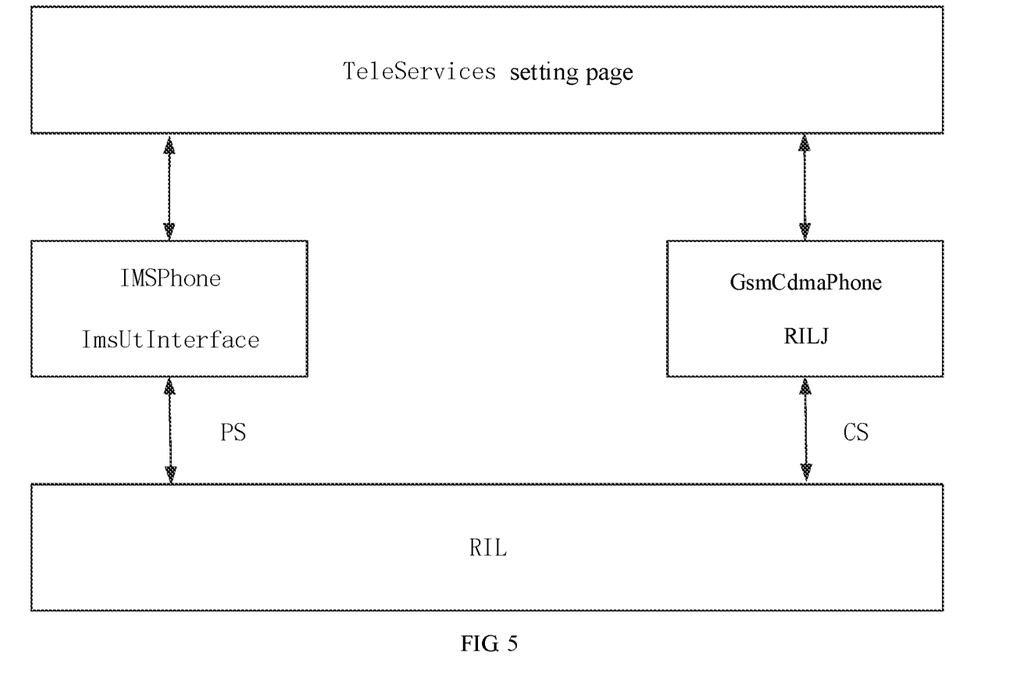
FIG. 5 is a flowchart showing a method for controlling communication of a terminal device according to an embodiment of the present disclosure.

In an example, as illustrated in FIG. 5, the call forwarding is used as the supplementary item. When the user queries the status of forwarding incoming calls, the getCallForwardingOption interface for obtaining the phone process is invoked to query the statuses of forwarding unconditional, forwarding busy, forwarding on No reply and forwarding when unreachable. If the IMS service is registered, the UT interface is available, and then the ImsUtInterface interface is invoked via the IMSPhone process to query RIL. It the IMS service does not meet the condition, the RIL Java interface is invoked via the GsmCdmaPhone to query RIL. It there is an abnormality, the query cannot be competed, and then a box prompting error is popped up. If there is no abnormality, the setting is successful and terminated.

In another example, the call forwarding is used as the supplementary item. The TeleService setting page provides four ways, including forwarding unconditional, forwarding busy, forwarding on No reply and forwarding when unreachable. When setting the forwarding unconditional, the phone number to be set to the forwarding unconditional is inputted, a launching button is clicked to performing the setting. When setting, if the IMS is in the registered status, or the UT interface is available, the IMSPhone process is selected and the ImsUtInterface interface is invoked to set RIL. Otherwise, the RIL Java (PILJ) interface is invoked via the GsmCdmaPhone process to set RIL. If the setting process has an abnormality, a box prompting error is popped up. If there is no abnormality, the setting is successful and terminated.

The querying and setting method is identical for the above examples of using the call waiting as the supplementary item and using the call barring as the supplementary item, which will not be repeated. Compared to the related art, in which for CF/CW/CB, merely the status of the UT interface is used as the determination condition at the APP side, or the IP multimedia subsystem service (IMSService) is separately as the determination condition, the method of the present disclosure introduces a retry basis. If the setting of the supplementary item cannot be performed via the PS domain, an attempt is automatically made to perform the setting of the supplementary item via the CS domain, such that the function of the supplementary item may become effective in worldwide operator networks.

It should be noted that, the call barring is special in the implementation. In the architecture shown in FIG. 4 and FIG. 5, the call barring is implemented as follows.

The password of the call barring set by the user is stored in the Teleservice module framework layer, and the PS domain or the CS domain is selected based on the conditions of the UT interface or the IMS network registration. If the UT interface is enabled, or the IMS network is registered successfully, the PS domain is preferentially selected through the IMS network, if it is failed via the PS domain, the CS domain is selected. If it is failed again, the functions of barring all outgoing calls, barring international calls, barring international calls aboard, barring all incoming calls, barring incoming calls in roaming are disabled sequentially.

For example, the setting of disabling barring all outgoing calls is the same as that for the call forwarding. When setting the barring all outgoing calls, it firstly determined whether the IMS service or the UT interface is available, if one of the IMS service and the UT interface is available, the ImsUtInterface interface is invoked the IMSPhone to set RIL, or else, the RIL Java interface is invoked via GsmCdmaPhone to set RIL.

After the barring all outgoing calls is disabled, the barring international calls is set. The same is used to determine whether IMS channel or RILJ channel is selected. When the setting of the barring international calls is completed, the barring international calls aboard is set. The same is used to determine whether IMS channel or RILJ channel is selected. When the setting of the barring international calls aboard is completed, the barring all incoming calls is set. The same is used to determine whether IMS channel or RILJ channel is selected. When the setting of the barring all incoming is completed, the barring all incoming calls in roaming is set.

The present disclosure further provides a CancellAll way for cancelling all items of the call barring. CarrierConfig: config_support_callbarring_cancel_all_by_sequence is configured, used to continually control the operator. If IMS is failed and RILJ is failed, it is determined whether the operator is configured with config_support_callbarring_cancel_all_by_sequence, if yes, a recursion is used to configure each CallBarring command.

Figure 6:
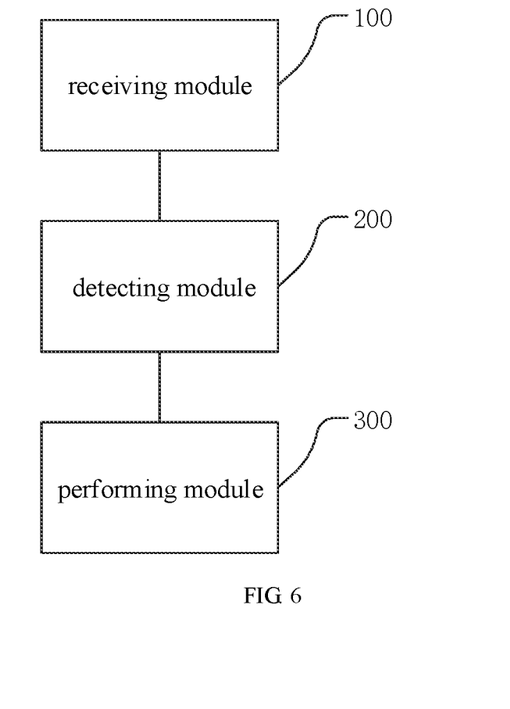
FIG. 6 is a block diagram showing a terminal device according to an embodiment of the present disclosure.

As illustrated in FIG. 6, the present disclosure further provides a terminal device, including a receiving module 100, a detecting module 200 and a performing module 300 coupled to each other electrically. The receiving module 100 is configured to receive supplementary item setting information. The detecting module 200 is configured to detect statuses of an internet protocol multimedia subsystem (IMS) and a UT interface in response to the supplementary item setting information. The performing module 300 is configured to perform setting of a supplementary item via a packet switch (PS) domain when the IMS in a registered status or the UT interface in an accessible status. The performing module 300 is further configured to perform the setting of the supplementary item via a circuit switch (CS) domain when the setting of the supplementary item cannot be performed via the PS domain. The terminal device of the present disclosure is configured to perform the method for controlling communication of a terminal device shown in FIG. 1.

Figure 7:
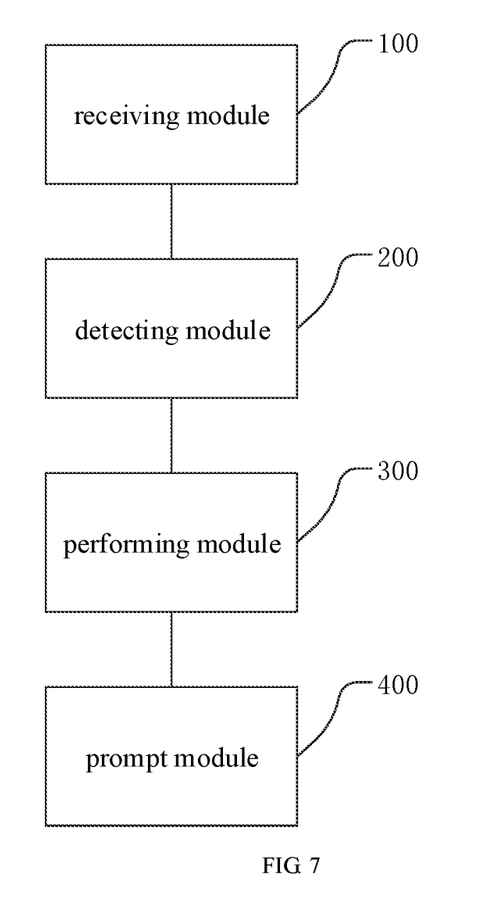
FIG. 7 is a block diagram showing a terminal device according to an embodiment of the present disclosure.

As illustrated in FIG. 7, the present disclosure further provides a terminal device, including a receiving module 100, a detecting module 200, a performing module 300 and a prompt module 400 coupled to each other electrically. The terminal device of the embodiment is configured to perform the method for controlling communication of a terminal device shown in FIG. 2 and FIG. 3. The prompt module 400 is configured to output failure prompt information when the setting of the supplementary item cannot be performed via the CS domain and/or output success prompt information when the setting of the supplementary item can be performed via either the PS domain or the CS domain.

Figure 8:
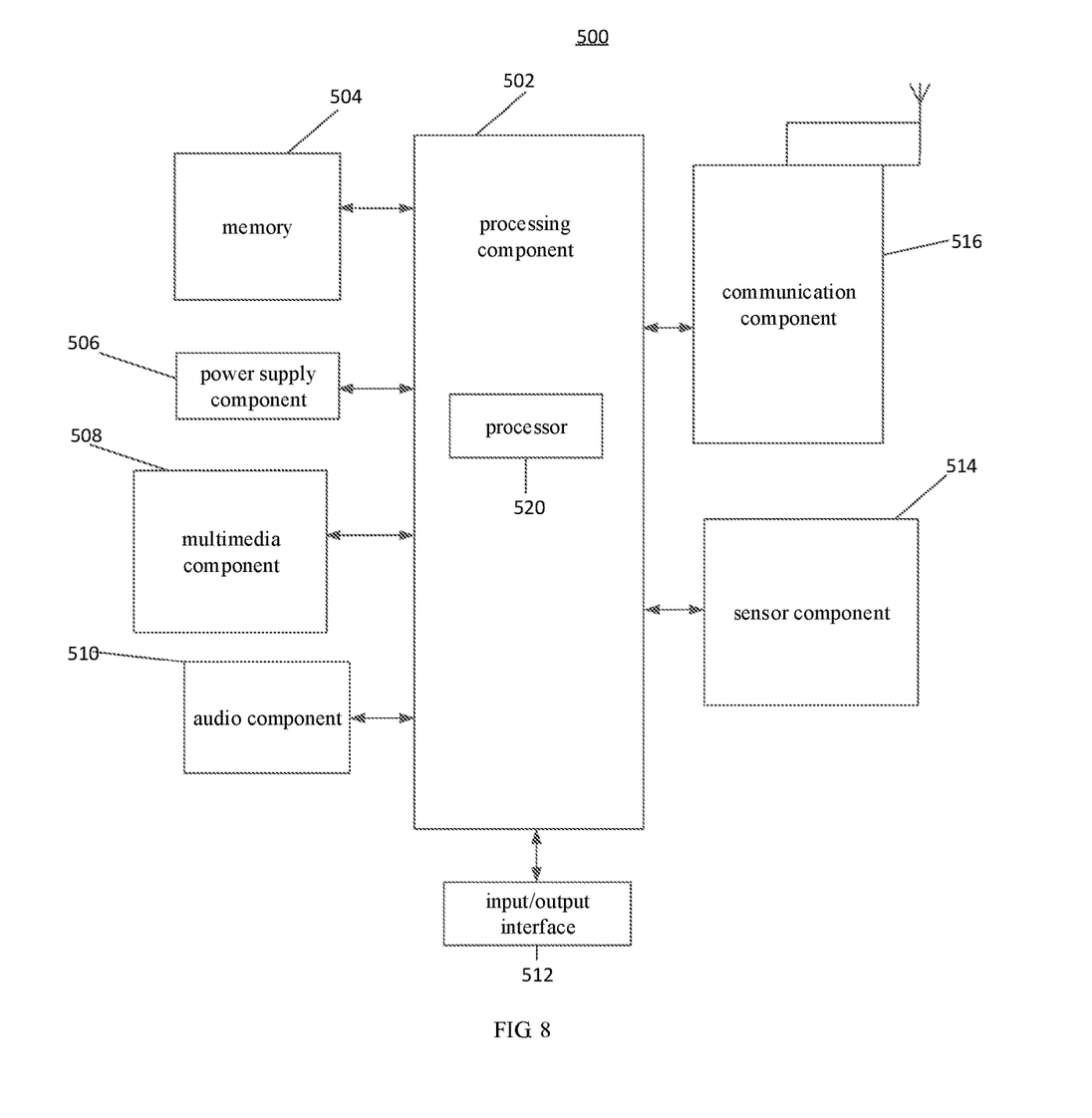
FIG. 8 is a block diagram showing a terminal device according to an embodiment of the present disclosure.

FIG. 8 is a block diagram of a terminal device. The present disclosure also provides a terminal device including a processor; memory for storing executable instructions of the processor. The processor is configured to execute the above-mentioned method. The device 500 may be a mobile phone, a computer, a digital broadcasting terminal, a messaging device, a game console, a tablet device, a medical device, a fitness device, a personal digital assistant, etc. The smart device can also be a photosensitive element, such as a light sensor.

The device 500 may include one or more components: a processing component 502, a memory 504, a power component 506, a multimedia component 508, an audio component 510, an input/output (I/O) interface 512, a sensor component 514, and a communication component 516.

The processing component 502 generally controls the overall operations of the device 500, such as operations associated with display, telephone calls, data communications, camera operations, and recording operations. The processing component 502 may include one or more processors 520 to execute instructions to complete all or part of the steps of the foregoing method. In addition, the processing component 502 may include one or more modules to facilitate the interaction between the processing component 502 and other components. For example, the processing component 502 may include a multimedia module to facilitate the interaction between the multimedia component 508 and the processing component 502.

The memory 504 is configured to store various types of data to support operations in the device 500. Examples of these data include instructions for any application or method operating on the device 500, contact data, phone book data, messages, pictures, videos, and so on. The memory 504 can be implemented by any type of volatile or non-volatile storage device or their combination, such as static random access memory (SRAM), electrically erasable programmable read-only memory (EEPROM), erasable and programmable read-only memory (EPROM), programmable read-only memory (PROM), read-only memory (ROM), magnetic memory, flash memory, magnetic disk or optical disk.

The power component 506 provides power to various components of the device 500. The power component 506 may include a power management system, one or more power supplies, and other components associated with generating, managing, and distributing power for the device 500.

The multimedia component 508 includes a screen that provides an output interface between the device 500 and the user. In some embodiments, the screen may include a liquid crystal display (LCD) and a touch panel (TP). If the screen includes a touch panel, the screen may be implemented as a touch screen to receive input signals from the user. The touch panel includes one or more touch sensors to sense touch, sliding, and gestures on the touch panel. The touch sensor can not only sense the boundary of the touch or slide action, but also detect the duration and pressure related to the touch or slide operation. In some embodiments, the multimedia component 508 includes a front camera and/or a rear camera. When the device 500 is in an operation mode, such as a shooting mode or a video mode, the front camera and/or the rear camera can receive external multimedia data. Each front camera and rear camera can be a fixed optical lens system or an optical lens system having focal length and optical zoom capabilities.

The audio component 510 is configured to output and/or input audio signals. For example, the audio component 510 includes a microphone (MIC). When the device 500 is in an operating mode, such as a call mode, a recording mode, and a voice recognition mode, the microphone is configured to receive external audio signals. The received audio signals may be further stored in the memory 504 or transmitted via the communication component 516. In some embodiments, the audio component 510 further includes a speaker for outputting audio signals.

The I/O interface 512 provides an interface between the processing component 502 and a peripheral interface module. The above-mentioned peripheral interface module may be a keyboard, a click wheel, a button, and the like. These buttons may include but are not limited to: home button, volume button, start button, and lock button.

The sensor component 514 includes one or more sensors for providing the device 500 with various aspects of state assessment. For example, the sensor component 514 can detect the open/close state of the device 500 and the relative positioning of components, such as the display and keypad of the device 500. The sensor component 514 can also detect the position change of the device 500 or a component of the device 500, presence or absence of contact of the user to the device 500, the orientation or acceleration/deceleration of the device 500, and the temperature change of the device 500. The sensor component 514 may include a proximity sensor configured to detect the presence of nearby objects when there is no physical contact. The sensor component 514 may also include a light sensor, such as a CMOS or CCD image sensor, for use in imaging applications. In some embodiments, the sensor component 514 may also include an acceleration sensor, a gyroscope sensor, a magnetic sensor, a pressure sensor or a temperature sensor.

The communication component 516 is configured to facilitate wired or wireless communication between the device 500 and other devices. The device 500 can access a wireless network based on a communication standard, such as Wi-Fi, 2G or 3G or a combination thereof. In an exemplary embodiment, the communication component 516 receives a broadcast signal or broadcast related information from an external broadcast management system via a broadcast channel. In an exemplary embodiment, the communication component 516 also includes a near field communication (NFC) module to facilitate short-range communication. For example, the NFC module can be implemented based on radio frequency identification (RFID) technology, infrared data association (IrDA) technology, ultra-wideband (UWB) technology, Bluetooth (BT) technology and other technologies.

In an exemplary embodiment, the device 500 may be implemented by one or more application specific integrated circuits (ASICs), digital signal processors (DSP), digital signal processing devices (DSPD), programmable logic devices (PLD), field programmable gate array (FPGA), controller, microcontroller, microprocessor, or other electronic components, used to perform the above methods.

Another exemplary embodiment of the present disclosure provides a non-transitory computer-readable storage medium, such as a memory 504 including instructions, which can be executed by the processor 520 of the device 500 to complete the foregoing method. For example, the computer-readable storage medium may be ROM, random access memory (RAM), CD-ROM, magnetic tape, floppy disk, optical data storage device, etc. When the instructions in the storage medium are executed by the processor of the smart device, the smart device can execute the above method.

Other embodiments of the present disclosure will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings and that various modifications and changes can be made without departing from the scope thereof. It is intended that the scope of the invention only be limited by the appended claims.

What is claimed is:

1. A method for controlling communication of a terminal device, comprising:
    receiving supplementary item setting information;
    detecting statuses of an internet protocol multimedia subsystem (IMS) and a UT interface in response to the supplementary item setting information;
    performing setting of a supplementary item via a packet switch (PS) domain when the IMS has registered status or the UT interface has accessible status; and
    performing the setting of the supplementary item via a circuit switch (CS) domain when the setting of the supplementary item cannot be performed via the PS domain;
    wherein the supplementary item comprises a call barring item which includes more than one barring sub-items, and the method further comprises:
    determining whether a current operator supports a separate configuration function when the supplementary item setting information is call barring setting information and the setting of the supplementary item cannot be performed via the CS domain; and
    performing the setting of the supplementary item on the more than one barring sub-items based on a predetermined configuration mode when the current operator supports the separate configuration function.

2. The method according to claim 1, further comprising:
    outputting failure prompt information when the setting of the supplementary item cannot be performed via the CS domain.

3. The method according to claim 1, further comprising:
    outputting success prompt information when the setting of the supplementary item can be performed via either the PS domain or the CS domain.

4. The method according to claim 1, wherein performing the setting of the supplementary item on the more than one barring sub-items based on the predetermined configuration mode comprises:
    configuring barring sub-item setting information of the more than one barring sub-items as the supplementary item setting information according to a predetermined order; and
    returning to a step of receiving the supplementary item setting information after the barring sub-item setting information of each of the more than one barring sub-items has been configured as the supplementary item setting information.

5. The method according to claim 1, wherein when the supplementary item is a call barring item, performing the setting of the supplementary item via the PS domain comprises:
  querying modem RIL by invoking an ImsUtInterface interface via an IMSphone.

6. The method according to claim 1, wherein when the supplementary item is a call barring item, performing the setting of the supplementary item via the CS domain comprises:
  querying modem RIL by invoking a RIL Java interface via a GsmCdmaPhone.

7. A terminal device, comprising:
  a processor;
  memory configured to store instructions executable by the processor;
  wherein, the processor is configured to execute a method for controlling communication of a terminal device, comprising:
  receiving supplementary item setting information;
  detecting statuses of an internet protocol multimedia subsystem (IMS) and a UT interface in response to the supplementary item setting information;
  performing setting of a supplementary item via a packet switch (PS) domain when the IMS has registered status or the UT interface has accessible status; and
  performing the setting of the supplementary item via a circuit switch (CS) domain when the setting of the supplementary item cannot be performed via the PS domain;
  wherein the supplementary item comprises a call barring item which includes more than one barring sub-items, and the processor is further configured to performing operations of:
  determining whether a current operator supports a separate configuration function when the supplementary item setting information is call barring setting information and the setting of the supplementary item cannot be performed via the CS domain; and
  performing the setting of the supplementary item on the more than one barring sub-items based on a predetermined configuration mode when the current operator supports the separate configuration function.

8. The terminal device according to claim 7, wherein the processor is further configured to performing an operation of:
  outputting failure prompt information when the setting of the supplementary item cannot be performed via the CS domain.

9. The terminal device according to claim 7, wherein the processor is further configured to performing an operation of:
  outputting success prompt information when the setting of the supplementary item can be performed via either the PS domain or the CS domain.

10. The terminal device according to claim 7, wherein performing the setting of the supplementary item on the more than one barring sub-items based on the predetermined configuration mode comprises:
  configuring barring sub-item setting information of the more than one barring sub-items as the supplementary item setting information according to a predetermined order; and
  returning to a step of receiving the supplementary item setting information after the barring sub-item setting information of each of the more than one barring sub-items has been configured as the supplementary item setting information.

11. The terminal device according to claim 7, wherein when the supplementary item is the call barring item, performing the setting of the supplementary item via the PS domain comprises:
  querying modem RIL by invoking an ImsUtInterface interface via an IMSphone.

12. The terminal device according to claim 7, wherein when the supplementary item is the call barring item, performing the setting of the supplementary item via the CS domain comprises:
  querying modem RIL by invoking a RIL java interface via a GsmCdmaPhone.

13. A non-transitory computer-readable storage medium having computer instructions stored thereon, executed by a processor of a smart device, to cause the processor to perform a method for controlling communication of a terminal device, comprising:
  receiving supplementary item setting information;
  detecting statuses of an internet protocol multimedia subsystem (IMS) and a UT interface in response to the supplementary item setting information;
  performing setting of a supplementary item via a packet switch (PS) domain when the IMS has registered status or the UT interface has accessible status; and
  performing the setting of the supplementary item via a circuit switch (CS) domain when the setting of the supplementary item cannot be performed via the PS domain;
  wherein the supplementary item comprises a call barring item which includes more than one barring sub-items, and the processor is further configured to performing operations of:
  determining whether a current operator supports a separate configuration function when the supplementary item setting information is call barring setting information and the setting of the supplementary item cannot be performed via the CS domain; and
  performing the setting of the supplementary item on the more than one barring sub-items based on a predetermined configuration mode when the current operator supports the separate configuration function.

14. The non-transitory computer-readable storage medium according to claim 13, wherein the processor is further caused to perform at least one of operations of:
  outputting failure prompt information when the setting of the supplementary item cannot be performed via the CS domain; and
  outputting success prompt information when the setting of the supplementary item can be performed via either the PS domain or the CS domain.

15. The non-transitory computer-readable storage medium according to claim 13, wherein performing the setting of the supplementary item on the more than one barring sub-items based on the predetermined configuration mode comprises:
  configuring barring sub-item setting information of the more than one barring sub-items as the supplementary item setting information according to a predetermined order; and
  returning to a step of receiving the supplementary item setting information after the barring sub-item setting information of each of the more than one barring sub-items has been configured as the supplementary item setting information.

16. The non-transitory computer-readable storage medium according to claim 13, wherein when the supplementary item is the call barring item, performing the setting of the supplementary item via the PS domain comprises:
  querying modem RIL by invoking an ImsUtInterface interface via an IMSphone.

17. The non-transitory computer-readable storage medium according to claim 13, wherein when the supplementary item is the call barring item, performing the setting of the supplementary item via the CS domain comprises:
  querying modem RIL by invoking a RIL java interface via a GsmCdmaPhone.

* * * * *